US005470652A

United States Patent [19]

Miura et al.

[11] Patent Number: 5,470,652

[45] Date of Patent: Nov. 28, 1995

[54] SUPPORT SHEET FOR PHOTOGRAPHIC PRINTING PAPER AND PROCESS FOR PRODUCING THE SHEET

[75] Inventors: Takaharu Miura, Chiba; Hiroyuki Nemoto, Ichikawa; Masataka Ito, Urawa; Masafumi Kobayashi, Tokyo; Chieko Tanaka, Ichikawa, all of Japan

[73] Assignee: Oji Paper Co., Ltd, Tokyo, Japan

[21] Appl. No.: 66,120

[22] PCT Filed: Oct. 2, 1992

[86] PCT No.: PCT/JP92/01278

§ 371 Date: Jun. 2, 1993

§ 102(e) Date: Jun. 2, 1993

[87] PCT Pub. No.: WO93/07533

PCT Pub. Date: Apr. 15, 1993

[30] Foreign Application Priority Data

| | | | |
|---|---|---|---|
| Oct. 3, 1991 | [JP] | Japan | 3-256445 |
| May 25, 1992 | [JP] | Japan | 4-132730 |
| Jul. 29, 1992 | [JP] | Japan | 4-202521 |
| Sep. 1, 1992 | [JP] | Japan | 4-233725 |
| Sep. 30, 1992 | [JP] | Japan | 4-262093 |

[51] Int. Cl.$^{6}$ .............................. B32B 29/00; G03C 1/86; B05D 3/06

[52] U.S. Cl. .......................... 428/328; 428/329; 428/330; 428/340; 428/409; 428/508; 428/509; 428/910; 427/496; 427/498; 427/499; 427/500

[58] Field of Search .................................... 427/496, 498, 427/499, 500; 428/537.5, 508, 509, 409, 331, 328, 330, 329, 910, 340

[56] References Cited

U.S. PATENT DOCUMENTS

| | | | |
|---|---|---|---|
| 4,396,671 | 8/1983 | Wanka et al. . | |
| 4,482,628 | 11/1984 | Katsura et al. | 430/538 |
| 4,554,175 | 11/1985 | Shibve et al. | 427/44 |
| 4,605,612 | 8/1986 | Asao et al. | 430/538 |
| 4,610,956 | 9/1986 | Fuchizawa et al. | 430/538 |
| 4,645,736 | 2/1987 | Anthonsen et al. | 430/538 |
| 5,084,344 | 1/1992 | Harada et al. | 428/334 |

FOREIGN PATENT DOCUMENTS

| | | |
|---|---|---|
| 0052735 | 6/1982 | European Pat. Off. . |
| 59-178450 | 10/1984 | Japan . |
| 61-128245 | 6/1986 | Japan . |
| 61-201241 | 9/1986 | Japan . |
| 1-172950 | 7/1989 | Japan . |
| 1-239549 | 9/1989 | Japan . |
| 2-154251 | 6/1990 | Japan . |

*Primary Examiner*—P.C. Sluby
*Attorney, Agent, or Firm*—Armstrong, Westerman, Hattori, McLeland & Naughton

[57] ABSTRACT

The support sheet for photographic printing paper of the present invention includes a substrate paper sheet, a front surface composite resin coating layer formed on the front surface of the substrate paper sheet and including an inside cured resin layer and outermost cured resin layer including, as a main component, an electron beam-curing product of electron beam-curable unsaturated organic compound, and a back surface resin coating layer formed on the back surface of the substrate paper sheet and including a film-forming synthetic resin, and is produced by a process including the steps of forming at least one inside coating liquid layer including an electron beam-curable unsaturated organic compound on the front surface of the substrate paper sheet;

separately forming an outermost coating liquid layer containing an electron beam-curable unsaturated organic compound on a shaping surface and applying thereto a first electron beam irradiation to provide an outermost cured resin layer;

superimposing the outermost cured resin layer and the inside coating liquid layer on the substrate paper sheet on each other, and applying a second electron beam irradiation to the resultant superimposed layer to provide a front surface composite resin coating layer composed of a laminate of the resultant at least one inside cured resin layer with the outermost cured resin layer; and coating a back surface of the substrate paper sheet with a film-forming synthetic resin.

36 Claims, 2 Drawing Sheets

SUPPORT SHEET FOR PHOTOGRAPHIC PRINTING PAPER AND PROCESS FOR PRODUCING THE SHEET

TECHNICAL FIELD

The present invention relates to a support sheet for photographic printing paper. More particularly, the present invention relates to a support sheet for a photographic paper sheet, which effectively prevents yellowing of a coated resin layer by developing treatment, has sufficient flexibility, and is, when converted to a photographic printing paper, capable of preventing or restricting a fogging in the photographic printing paper even when storing it for a long period of time, and a process for producing the same.

BACKGROUND ART

Currently, a polyolefin-coated support sheet produced by coating both surfaces of a substrate consisting of a paper sheet with a polyolefin resin is widely employed as a support sheet for photographic printing paper. Since the polyolefin coating layer is hydrophobic, the above-mentioned type of support sheet is advantageous in comparison with baryta paper in that in develop-fixing treatment, the treating liquid is not allowed to easily penetrate into the support sheet, and thus the necessary time for water-rinsing and drying is significantly shortened. Also, the support sheet has an advantage that since the treating liquid does not penetrate into the substrate paper sheet, the shrinkage and elongation of the support sheet are restricted and thus the support sheet exhibits an excellent dimensional stability.

For the purpose of enhancing an opacifying power or image-forming property, the polyolefin resin in the coating layer of the support sheet is mixed with an inorganic white pigment such as titanium dioxide. The pigment has a poor dispersing property for the resin and causes a problem such that when the resin is melt-extruded, the resin is foamed by a volatile component contained in the pigment and thus the resultant resin coating layer is cracked or broken. For this reason, it is impossible to increase the content of the pigment in the coating layer to a high level sufficient to obtain a satisfactory opacifying power and the image-forming property.

Generally speaking, when titanium dioxide pigment is employed, it is difficult to add this pigment at a content of about 20% by weight or more. Therefore, the photographic printing paper produced from this type of support sheet for photographic printing sheet is unsatisfactory in sharpness of images.

Recently, a support sheet for photographic printing paper, having an electron beam-cured resin coated layer formed by coating a resin composition curable by an electron beam irradiation, namely an electron beam-curable resin, on a support sheet, was provided by, for example, Japanese Examined Patent Publication (Kokoku) No. 60-17,104, Japanese Examined Patent Publication (Kokoku) No. 60-17,105, and Japanese Unexamined Patent Publication (Kokai) No. 57-49,496. In accordance with this method, when the coating layer is formed, it is unnecessary to heat and melt the resin composition at a high temperature, and thus the pigment content can increase to 20 to 80% by weight. Therefore, the photographic printing paper sheet produced from the above-mentioned type of support sheet has a significantly enhanced image sharpness in comparison with the conventional photographic printing paper sheet having the polyolefin resin coating layers. Nevertheless, with respect to the photographic printing paper produced by coating a photographic photosensitive layer on an electron beam-cured resin-coating layer cured by an electron beam irradiation, it is known that in the developing treatment, a phenomenon that a photographic developing reagent is absorbed by and remains in the resin coating layer, and thus the photographic printing sheet is discolored yellow after the developing treatment, namely a yellowing phenomenon occurs, and when a developing treatment is applied to the photographic printing paper after a lapse of a storage period, the degree of fogging increases to a level not negligible for practical use or the photosensitivity thereof changes. On the other hand, it is known that the resultant coating layer is hard and has little flexibility and thus is sometimes cracked or broken.

There have been made various attempts to overcome the above-mentioned fogging problem. For example, Japanese Examined Patent Publication (Kokoku) No. 1-21,495 discloses a method of providing a polyethylene coating layer on an electron beam-cured resin coating layer to inhibit the change in the photosensitivity during storage. In this method, however, there is a problem that the fogging-reducing effect cannot be enhanced unless the thickness of the polyethylene coating layer is increased, and thus the enhancement in the image sharpness which is the largest benefit of the utilization of the electron beam-curing technology must be sacrificed.

Also, Japanese Unexamined Patent Publication (Kokai) No. 60-144,736 discloses a method of inhibiting the change in the photographic sensitivity by arranging an interception layer between a substrate and an electron beam-cured resin coating layer. This method is, however, unsatisfactory in fogging prevention when stored for a long period of time, if the material as disclosed in the publication is used for forming the interception layer.

To prevent the fogging and yellowing and to make the coating layer soft, various methods, in which specific electron beam-curable polymers or electron beam-curable monomers are employed, are disclosed in, for example, Japanese Unexamined Patent Publication (Kokai) No. 59-124,336 (acrylic acid ester monomer), Japanese Unexamined Patent Publication (Kokai) No. 60-70,446 (urethane resin having double bond), Japanese Unexamined Patent Publication (Kokai) No. 61-204,241 (diacrylate, triacrylate, and epoxidized acrylate), Japanese Unexamined Patent Publication (Kokai) No. 61-236,547 (tetraacrylic ester), Japanese Unexamined Patent Publication (Kokai) No. 62-61,049 (hexaacrylate ester), Japanese Unexamined Patent Publication (Kokai) No. 62-109,046 (polybutadiene-containing resin), Japanese Unexamined Patent Publication (Kokai) No. 62-141,543 (heterocyclic ring-containing acrylate) and Japanese Unexamined Patent Publication (Kokai) No. 2-47 (acrylate ester of addition product of polyhydric alcohol with acrylic acid polymer). However, even if these methods are used, the above-mentioned problems are not sufficiently solved.

With respect to the yellowing of the coating layer by the developing liquid, which has a close relationship to the fogging concentration and the flexibility of the coating layer, there is an opposite tendency in the yellowing due to exposure dose. Namely, when the electron beam is irradiated at a high exposure dose, the degree of yellowing of the coating layer by the developing liquid is restricted to a low level, the degree of fogging becomes higher, and thus the flexibility of the coating layer is reduced. On the other hand, at a low exposure dose, the fogging is inhibited and the flexibility of the coating layer is secured to a certain extent, and the degree of yellowing significantly increases, and the physical properties, for example, bonding property and mechanical strength of the coating layer are deteriorated.

Accordingly, to prevent the yellowing without reducing the physical properties of the coating layer, it is necessary to provide a structure of a new support sheet in which an appropriately selected electron beam-curable unsaturated organic compound is used, and even when the electron beam is applied in an exposure dose large enough to bring about the formation of crosslinkages in the coating layer, the fogging does not occur, and the flexibility of the coating layer and the mechanical properties and quality of the substrate paper sheet are not deteriorated, and a process for producing the same. This is very important to effectively eliminate all the above-mentioned problems simultaneously.

DISCLOSURE OF THE INVENTION

An object of the present invention is to overcome the above-mentioned problems of the prior arts and to provide a support sheet suitable for producing a photographic printing paper having excellent photographic properties, namely a high surface smoothness, a high waterproof property, a high property for preventing fogging by developing treatment even after a lapse of a period of storage time, a highly flexible coating layer, a high yellowing-preventing property, and a decreased deterioration in paper strength and quality of the substrate paper sheet.

The support sheet for photographic printing paper of the present invention for attaining the above-mentioned object comprises a substrate paper sheet comprising a natural pulp as a principal component; a front surface resin coating layer formed on a surface of the substrate paper sheet and comprising, as a principal component, an electron beam-curing product of at least one unsaturated organic compound which is curable by an electron beam irradiation; and a back surface resin coating layer formed on the opposite surface of the substrate paper sheet and comprising, as a principal component, at least one film-forming synthetic resin, the front surface resin layer being a front surface composite coating layer having a laminate structure composed of at least one inside cured resin layer and an outermost cured resin layer laminated on the inside cured resin layer.

The process of the present invention for producing a support sheet for photographic printing paper, comprises the steps of:

forming at least one inside coating liquid layer comprising, as a principal component, at least one unsaturated organic compound curable by an electron beam irradiation on a surface of a substrate paper sheet comprising, as a principal component, a natural pulp;

separately forming an outermost cured resin layer on a shaping surface by forming an outermost coating liquid layer comprising, as a principal component, at least one unsaturated organic compound curable by an electron beam irradiation on the shaping surface, and then applying a first electron beam irradiation onto the outermost coating liquid layer;

superimposing the inside coating liquid layer formed on the substrate paper sheet on the outermost cured resin layer and then applying a second electron beam irradiation to the resultant superimposed layer, thereby forming a front surface composite resin coating layer having a laminate structure consisting of (1) at least one inside cured resin layer adjacent to the substrate paper sheet and (2) an outermost cured resin layer laminated on and bonded to the inside cured resin layer;

releasing the resultant laminate composed of the substrate paper sheet and the front surface composite resin coating layer from the shaping surface; and forming a back surface resin coating layer comprising, as a principal component, a film-forming synthetic resin on the opposite surface of the substrate paper sheet.

BEST MODE OF CARRYING OUT THE INVENTION

Figure 1:
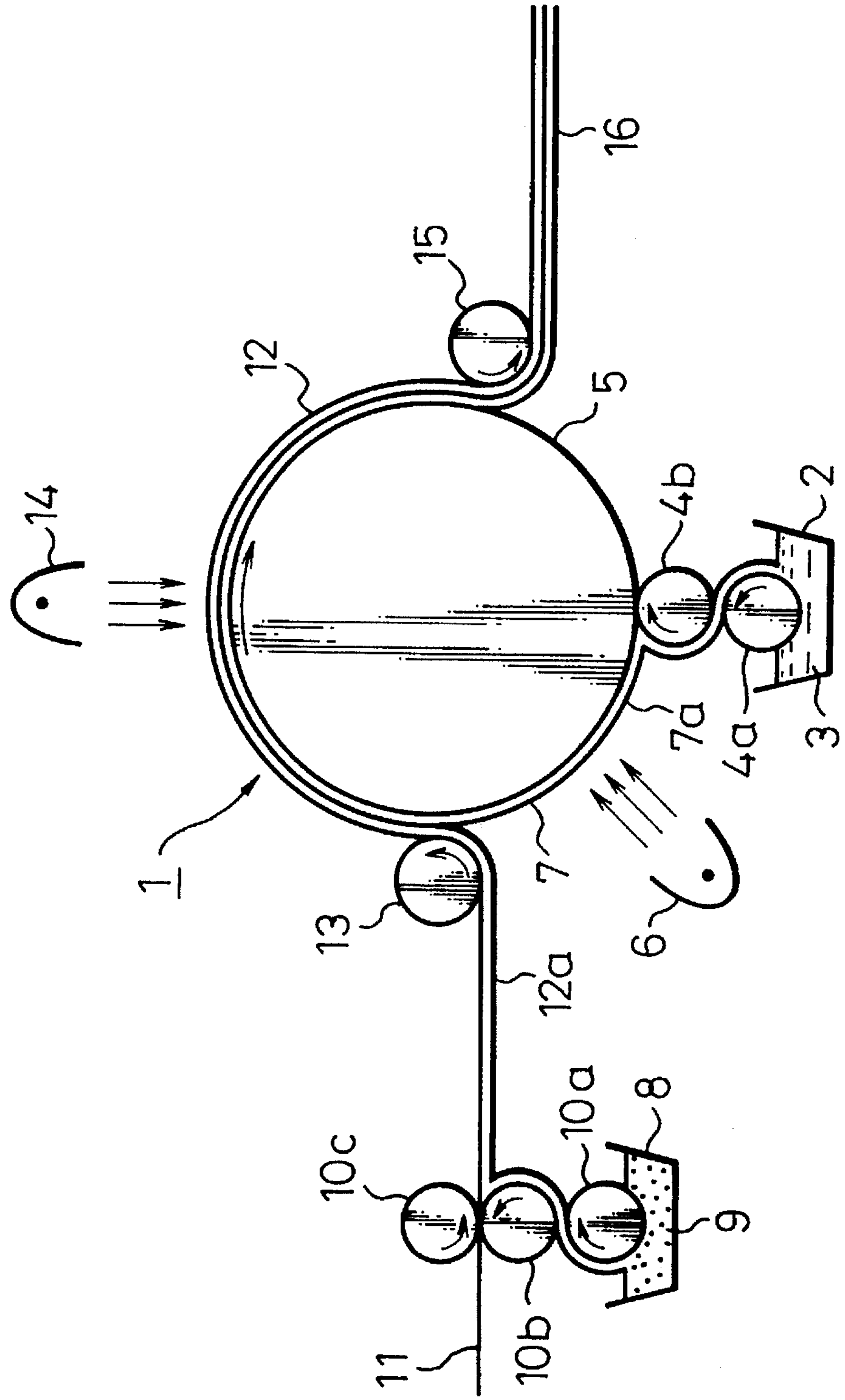
FIG. 1 is an explanatory drawing of a process of the present invention for producing a support sheet for photographic printing paper in which process, a front surface composite resin coating layer having a two layer structure is formed by using a metallic drum as a shaping surface.

Generally, in a conventional photographic printing paper produced from a support sheet which is produced by coating an available electron beam-curable compound composition on a substrate paper sheet comprising a natural pulp as a principle component thereof, a phenomenon of yellow discoloring after developing treatment, namely a yellowing phenomenon occurs. Although the reasons for the yellowing phenomenon are not completely clear, it is assumed that a principal reagent in the photographic developing agent is absorbed by and remains in the support sheet and is then oxidized to discolor the support sheet.

To prevent the yellowing, it is effective to reduce the absorption of the developing agent. For this purpose, the yellowing can be restricted by increasing the exposure dose of the electron beam for curing the resin composition, by increasing the amount of the polyfunctional unsaturated organic compound monomer or oligomer to be used, or by increasing the amount of the unsaturated organic compound having a relatively low molecular weight and a large number of cross-linking points. However, these methods are disadvantageous in that the flexibility of the coating layer is reduced, the fogging of the resultant photographic printing paper is promoted when the electron beam is irradiated at an increased exposure dose, and the substrate paper sheet is discolored yellow by a shock due to the electron beam irradiation.

The inventors of the present invention investigated these points and as a result, found that the above-mentioned problems can be effectively overcome by forming the front surface resin coating layer comprising, as a principal component, an electron beam-curing product of an unsaturated organic compound curable by an electron beam irradiation into a composite laminate structure having two layers or more, and by using a polyfunctional unsaturated organic compound composition curable by an election beam irradiation for a coating liquid from which an outermost layer is formed, thereby forming an outermost cured resin layer having a high crosslinking density. Namely, the inventors succeeded in simultaneously improving the flexibility and the yellowing-preventing property of the support sheet by arranging a resin coating layer having a high crosslinking density in an outermost layer of the support sheet with which the developing liquid comes into contact through a photographic emulsion layer in a developing treatment, and locating a resin coating layer having a relatively low crosslinking density and a high flexibility in an inside layer of the support sheet with which the developing liquid does not come into contact.

The support sheet of the present invention having a front surface composite resin coating layer composed of a plurality of resin layer can be produced by a first method in which at least one surface of a substrate paper sheet comprising a natural pulp as a principal component is coated with at least one inside coating liquid layer comprising, as a principal component, an electron beam-curable unsaturated organic compound; this inside coating liquid layer is coated in a wet-on-wet manner with an outermost coating liquid layer comprising, as a principal component, an electron beam-curable unsaturated organic compound; and then an electron beam irradiation is applied to the superimposed layer.

Also, the support sheet of the present-invention can be produced by a second method in which the inside coating liquid layer is formed on the substrate paper sheet; a first electron beam irradiation is applied to the inside coating liquid layer; the resultant inside cured resin layer is coated in a wet-on-dry manner with the outermost coating liquid layer; and then a second electron beam irradiation is applied to the resultant superimposed layer.

Further, the support sheet of the present invention can be produced by a third method in which a coating liquid for the outermost layer is coated on a shaping surface, for example, a smooth surface of a metal drum, plastic material or process paper; a first electron beam irradiation is applied to the resultant outermost coating liquid layer to provide an outermost cured resin layer; separately, a coating liquid for the inside layer is coated on a substrate paper sheet; the outermost cured resin layer is transfer-laminated from the shaping layer to the wet coating surface of the inside coating liquid layer; and a second electron beam irradiation is applied to the laminate.

Furthermore, the support sheet of the present invention can be produced by a fourth method similar to the above-mentioned transfer-coating method, except that the inside coating liquid layer and the outermost coating liquid are laminated in a wet-on-wet manner, and an electron beam irradiation is applied to the laminate.

In any of the above-mentioned methods, freedom in coating is enhanced by employing two or more coating liquids separately and superimposing the coating liquid layers on each other, the coating performance is improved, and a specific function can be imparted to each of the resin layers. Also, when the transfer-coating manner is utilized, the smoothness of the surface can be further improved.

In any case in which the above-mentioned coating methods are utilized, the front surface composite resin coating layer comprising an electron beam-curable unsaturated organic compound is formed into a laminate structure having two layers or more and coating performance and smoothness can be improved.

Also, in the present invention, the inside layer and the outermost layer of the front surface composite resin coating layer can be formed from the unsaturated organic compounds different from each other so as to impart different functions to the layers, and various combinations of different compounds for the layers result in various combinations of different functions of the layers; whereby the yellowing and fogging of the product can be reduced and the flexibility of the coating layer can be enhanced.

Further, in the present invention, the outermost coating liquid layer is press-formed on a shaping surface, whereby the smoothness of the surface of the front surface cured resin layer is further enhanced.

In the support sheet having a plurality of layers laminated on each other, to balance the flexibility, yellowing-preventing property and fogging-preventing property of the front surface composite resin coating layer, the coating liquid amounts for the outermost layer and the inside layer are preferably specified. Namely, preferably, the total coating liquid amount for the front surface composite resin coating layer is 5 g/m$^2$ to 60 g/m$^2$, more preferably 15 g/m$^2$ to 60 g/m$^2$ after curing. When the front surface composite resin coating layer is present in the above-mentioned total amount, the resultant support sheet for photographic printing paper has a satisfactory smoothness, opacifying power and resolving power, each maintained at an appropriate level.

Regardless of the type of resin, the amount of the outermost layer is preferably 0.5 g/m$^2$ to 20 g/m$^2$, more preferably 1 g/m$^2$ to 10 g/m$^2$ after curing, to allow the resultant outermost layer to exhibit the best performance thereof, and to secure the satisfactory flexibility and yellowing-preventing property of the coating layer. When the amount of the coating layer is less than 0.5 g/m$^2$, the satisfactory smoothness and yellowing-preventing property of the resultant support sheet is not secured. Also, when the amount of the coating layer is more than 20 g/m$^2$, the satisfactory flexibility of the support sheet is not secured, and the front surface composite resin coating layer is sometimes easily bent or cracked. In the front surface composite resin coating layer of the present invention, the electron beam-curable organic compound usable for forming the outermost coating liquid layer to be used for forming a surface on which a photographic emulsion layer is coated, is not limited to a specific type of compound as long as the compound is able to provide a high crosslinking density resin layer, and may be a monomer alone or oligomer alone, or may be used in a mixture of the above-mentioned monomer and oligomers. Preferably, the outermost coating liquid comprises, as a principal component, an unsaturated organic compound having four or more crosslinking functional groups.

The organic compound usable for forming the inside layer located in the substrate paper sheet side, is not limited to a specific type of compound. Preferably, the organic compound has less than four crosslinking functional groups. With respect to the inside cured resin layer, since there is no possibility of yellowing, it is not necessary to increase the crosslinking density thereof, and therefore, a resin having a high flexibility should be selected.

The electron beam-curable unsaturated organic compound usable for the present invention can be selected, for example, from:

(1) acrylate compounds of aliphatic, cycloaliphatic and aromatic mono- to hexa-valent alcohols and polyalkyleneglycols;

(2) acrylate compounds of addition reaction products of aliphatic, cycloaliphatic and aromatic mono-to hexa-valent alcohols with alkyleneoxides;

(3) polyacryloylalkylphosphoric acid esters;

(4) reaction products of carboxylic acids with polyols and acrylic acid;

(5) reaction products of isocyanates with polyols and acrylic acid;

(6) reaction products of epoxy compounds with acrylic acid; and (7) reaction products of epoxy compounds with polyols and acrylic acid.

Particularly, the electron beam-curable unsaturated organic compound is preferably selected from polyoxyethyleneepichlorohydrin-modified bisphenol A diacrylate, dicyclohexylacrylate, epichlorohydrin-modified polyethyleneglycoldiacrylate, 1,6-hexanedioldiacrylate, hydroxypivalic acid ester neopentylglycoldiacrylate, nonylphenoxypolyethylene glycolacrylate, ethyleneoxide-modified phenoxidized phosphoric acid acrylate, ethyleneoxide-modified phthalic acid acrylate, polybutadieneacrylate, caprolactam-modified tetrahydrofurfurylacrylate, tris(acryloxyethyl) isocyanurate, trimethylolpropanetriacrylate, pentaerythritoltriacrylate, pentaerythritoltetraacrylate, dipentaerythritolhexaacrylate, polyethyleneglycoldiacrylate, 1,4-butadienediol diacrylate, neopentylglycoldiacrylate, and neopentylglycol-modified trimethylolpropanediacrylate.

In the present invention, these compounds can be used alone or in a mixture of two or more thereof. As an unsaturated organic compound to be used for the outermost layer, as mentioned above, a compound having 4 or more crosslinking functional groups is effectively employed to impart a high degree of crosslinkage.

In the front surface composite resin coating layer of the present invention, to enhance the sharpness of images on the photographic printing paper, a white pigment is preferably contained therein. As the white pigment, titanium dioxide (anatase type and rutile type) is usually employed. Other pigments, for example, barium sulfate, calcium carbonate, aluminum oxide, zinc oxide, magnesium oxide and magnesium hydroxide can also be used. Also, other additives are optionally used.

Preferably, the content of the white pigment is 20% to 80% by weight based on the total solid content weight of the front surface composite resin coating layer. When the content is less than 20% by weight, the photographic images on the resultant photographic printing paper sometimes exhibit an unsatisfactory sharpness. Also, when the content is more than 80% by weight, the resultant resin coating layer exhibits a reduced flexibility and sometimes is cracked.

To disperse the white pigment in the above-mentioned electron beam-curable unsaturated organic compound, a three roll mill, two roll mill, Caules dissolver, homomixer, sand grinder, Planetary mixer, paint conditioner or ultrasonic disperser can be employed.

As a coating procedure of the electron beam-curable unsaturated organic compound on the shaping surface or the substrate paper sheet surface can be carried out by any of, for example, a bar-coating method, blade-coating method, squeeze-coating method, air knife-coating method, roll-coating method, gravure coating method, or transfer-coating method. Further, for this coating procedure, a fountain coater or slit die coater system can be utilized. Particularly, when a surface of a metal-made drum is utilized as a shaping surface, a roll coating method using a rubber roll or an offset gravure coating method is used so as not to damage the shaping surface.

Otherwise, a non-contact type coater, namely, a fountain coater or slit die coater is beneficially used.

As mentioned before, there are four methods for forming the front surface composite resin coating layer having a multilayered structure having two or more layers. In any of the four processes, the outermost coating liquid layer preferably comprises, as a principal component, an unsaturated organic compound having four or more crosslinking functional groups. The order of the coating liquid-coating operations and the exposure dose of the electron beam for the coating liquid layers are variable depending on the type of coating methods.

When the outermost cured resin layer is formed from the unsaturated organic compound having 4 or more crosslinking functional groups to enhance the crosslinking density and prevent the yellowing, and the inside cured resin layer having a low crosslinking density is formed to enhance the total flexibility of the coating layer, the second method is not preferable because a large amount of electron beam is irradiated to the inside layer. In this case, the first and fourth methods are preferable because only one electron beam irradiation is applied. However, in order to enhance the smoothness of the front surface composite resin coating layer, the fourth method is preferred because the cured resin layer is transfer-coated from a shaping surface. The third method is also a transfer method, and a large amount of electron beam is irradiated to the outermost layer. Therefore, this method is most preferable to form an outermost layer having a high smoothness and a high crosslinking density.

The specific effect of the present invention can be beneficially obtained by utilizing the above-mentioned third method, namely the process of the present invention. The apparatus usable for the process of the present invention will be explained by referring to the attached drawings. Those drawings indicate outlines of the embodiments of the process of the present invention.

In the apparatus 1 for coating and curing a coating liquid as shown in FIG. 1, an electron beam-curable resin composition 3 for forming an outermost cured resin layer in a container 2 is coated by using coaters **4*a*, 4*b*, for example, offset gravure coaters, on a surface of a metallic drum 5 which provides a shaping surface to form an outermost coating liquid layer 7*a*, and then the coating liquid layer 7*a* is cured by an electron beam irradiation from a first electron beam irradiation apparatus 6, to form an outermost cured resin layer 7**.

Separately, an electron beam-curable resin composition 9 for an inside coating liquid layer in a container 8 is coated on a substrate paper sheet 11 by using coaters **10*a*, 10*b*, and 10*c*, to form an inside coating liquid layer 12*a* having a high flexibility. This inside coating liquid layer 12*a* is superimposed on the outermost cured resin layer 7 on the metallic drum 5 through a guide roll 13. A second electron beam irradiation apparatus 14 irradiates an electron beam toward the inside coating liquid layer 12*a* through the substrate paper sheet to provide a front surface composite resin coating layer in which the resultant inside cured resin layer is bonded to the outermost cured resin layer. The cure-bonded laminate 16 composed of the substrate paper sheet and the front surface composite resin coating layer are released from the shaping surface of the metal drum through a guide 15**. A back surface resin coating layer may be preliminarily formed on the back surface of the substrate paper sheet.

Figure 2:
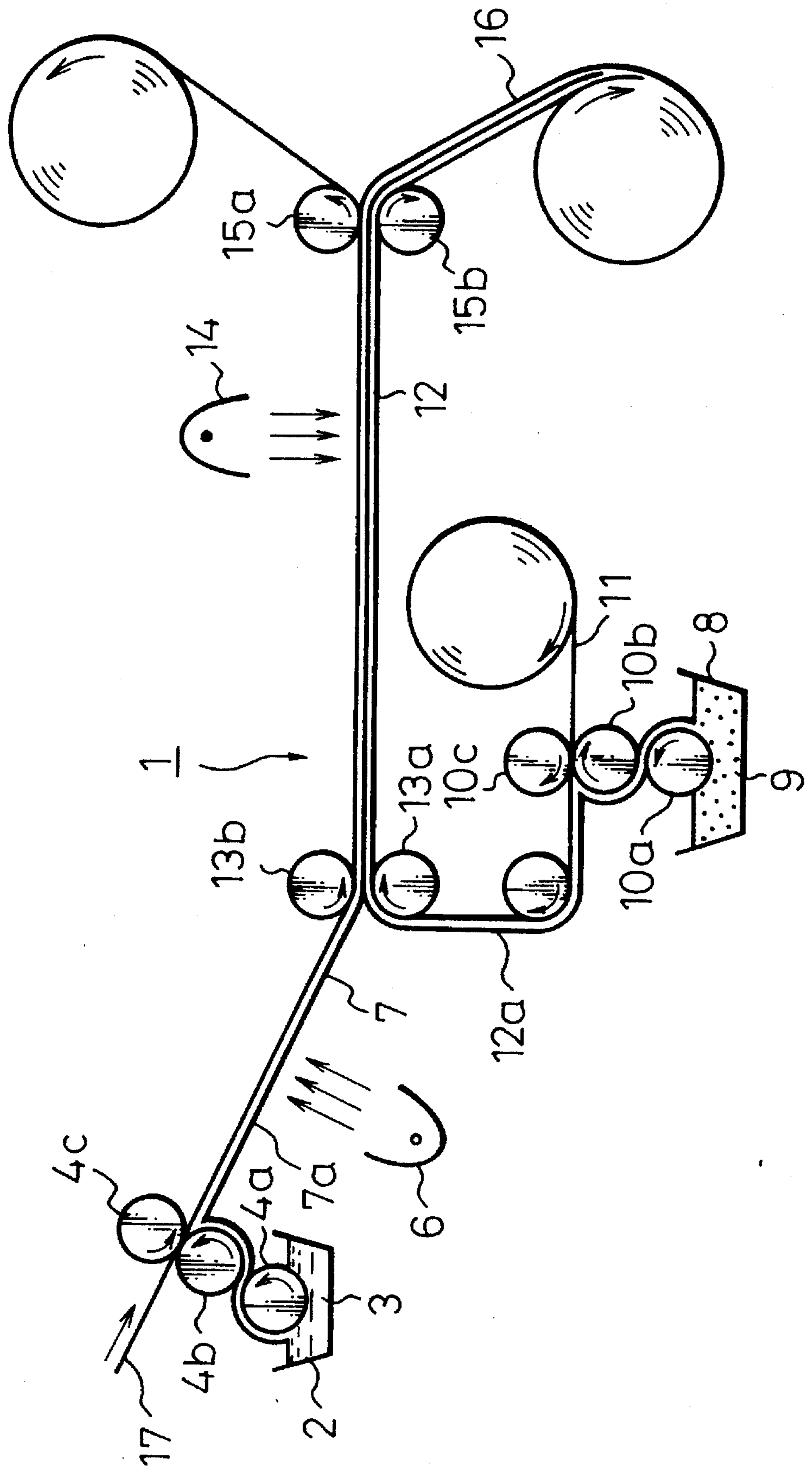
FIG. 2 is an explanatory drawing of a process of present invention for producing a support sheet for photographic printing paper in which process, a front surface composite resin coating layer having a two layer structure is formed by using a film material as a shaping surface.

In FIG. 2, an embodiment of the process of the present invention in which a film 17 is utilized as a shaping surface is illustrated. Namely, in this process, a polymer film, for example, polyester film, is used as a base material which provides a shaping surface. In this embodiment, as shown in FIG. 2, the irradiation from the second electron beam irradiation apparatus 14 may be applied through the shaping film 17, or through the substrate paper sheet 11 located on the opposite side to the shaping film 17. This film is wound up, and thereafter can be repeatedly reused. For this repeated reuse, the film may be in the form of an endless belt. The shaping film is not always a polymer film. This may be a belt-shaped metal membrane. Also, this metal membrane may be in the form of an endless belt. In the above-mentioned processes, the inside coating liquid layer may be formed by laminating two or more liquid coating layers. In this case, the liquid coating layers may be the same as or different from each other in the composition thereof.

In any of the above-mentioned processes, the outermost cured resin layer is formed by two electron beam irradiations in total, and thus has a high crosslinking density and is very contributory for preventing the yellowing of the resultant photographic printing paper. In accordance with the present invention, since the exposure dose of the electron beam to the substrate paper sheet can be restricted to a small amount, the discoloration of the substrate paper sheet caused by the electron beam irradiation can be restricted and also, the fogging of the photographic printing paper derived from the electron beam irradiation to the substrate paper sheet can be restricted even after storage for a long period of time.

In the process of the present invention, the electron beam accelerator usable for the electron beam irradiation is not limited to a specific type thereof. For example, a bundegrafe scanning type, double scanning type and curtain beam type electron beam irradiation apparatuses can be used for the process of the present invention. Among them, the curtain beam type apparatus which can provide a high output at a relatively low cost is beneficially utilized for the process of the present invention. When the electron beam is irradiated, the acceleration voltage is preferably 100 to 300 kV and the absorbed dose is preferably 0.1 to 6 Mrad, more preferably 0.2 to 4 Mrad.

The first and second electron beam irradiations are preferably carried out in an atmosphere having an oxygen content of 500 ppm or less. If the oxygen content is more than 500 ppm, sometimes, oxygen serves as a retarder to cause the resin composition to be incompletely cured.

In the third method in which a cured resin layer cured by a first electron beam irradiation is superimposed on a coating liquid layer, and then a second electron beam irradiation is applied to the resultant superimposed layer, the electron beam-curable coating liquid layer does not directly come into contact with oxygen during the electron beam irradiation, and thus the oxygen content in the atmosphere during the electron beam irradiation does not need to be reduced. However, for the purpose of preventing a generation of ozone, or of cooling a window which is heated when the electron beam passes therethrough, an inert gas can be used for the atmosphere.

In the support sheet of the present invention, the film-forming synthetic resin usable for forming the back surface resin coating layer is selected from polyolefin resins and the above-mentioned electron beam-cured resins which are used in the production of conventional support sheets for photographic printing paper.

The polyolefin resins usable for forming the back surface resin coating layer can be selected from homopolymers of ethylene, and α-olefins, for example, propylene, copolymers of two or more of the above-mentioned olefins, and mixtures of at least two of the above-mentioned polymers. Particularly, preferable polyolefin resins are low density polyethylenes, high density polyethylenes, straight linear, low density polyethylenes, and mixtures of the above-mentioned polymers. There is no limitation in the molecular weight of the polyolefin resins. Usually, polyolefin resins have a molecular weight of 20,000 to 200,000. Optionally, the polyolefin resins are mixed with a small amount of an antioxidant and a lubricant.

When the back surface resin coating layer is formed by using the polyolefin resin, a customary melt-extrude-coating method can be employed.

Also, the back surface resin coating layer can be formed from an electron beam-curable unsaturated organic compound. For this purpose, all the compounds usable for forming the above-mentioned front surface resin coating layer can be used. Further, the method for forming the back surface resin coating layer may be the same as that for the front surface resin coating layer having a laminate structure. There is no limitation on the weight of the back surface resin coating layer. Usually, the weight of the back surface resin coating layer is in the range of from 10 to 40 g/m$^2$.

The substrate paper sheet usable for the present invention usually has a basis weight of 50 to 300 g/m$^2$ and is provided with smooth surfaces. All the customary substrate paper sheets usable for the conventional support sheets for the photographic printing paper can be utilized for the present invention. The natural pulp usable for forming the substrate paper sheet is selected from soft wood pulp, hard wood pulp and mixtures of the soft wood pulp and the hard wood pulp. The substrate paper sheet may contain therein a filler.

For the purpose of preventing the fogging of the resultant photographic printing sheet generated during a long period of storage, a magnesium compound, for example, magnesium hydroxide, magnesium oxide, and magnesium salts, for example, magnesium carbonate or magnesium sulfate, is effectively contained in the substrate paper sheet. Further, conventional additives, for example, a sizing agent, fixing agent, paper strengthening agent, filler, antistatic agent, pH-regulating agent, pigment and dye usable for conventional paper may be added to the substrate paper sheet. Further, the substrate paper sheet may have a coating layer consisting of a surface-sizing agent, pigment, dye or antistatic agent, applied on a surface thereof.

In another embodiment of the process of the present invention, an outermost cured resin layer is formed by applying a first electron beam irradiation to an outermost coating liquid layer in an atmosphere having an oxygen content of 600 ppm or more, preferably 1,000 ppm or more.

The above-mentioned process effectively enhances the bonding property of the outermost cured resin layer to the inside cured resin layer and prevents the yellowing of the resultant photographic printing paper generated by a developing treatment.

In this process, as mentioned above, the electron beam-curable resin is coated on a shaping surface, the resultant outermost coating liquid layer is cured by an electron beam irradiation in the atmosphere having a high oxygen content of 600 ppm or more to form the outermost cured resin layer. In this case, one side surface (outermost front surface) of the outermost coating liquid layer in contact with the shaping surface is in such a state that no oxygen is present or oxygen is present in an extremely small amount, in comparison with the other surface (outermost back surface) of the outermost coating liquid exposed to the atmosphere having a high oxygen content. Therefore, a difference in crosslinking density between the outermost front surface portion and the outermost back surface portion of the outermost coating liquid layer is created, and thus the outermost front surface portion has a higher crosslinking density than that of the outermost back surface portion.

Namely, since the outermost front surface of the resultant outermost cured resin layer which will be brought into contact with the developing liquid, is formed by a hard and dense resin, the developing agent is not absorbed by the outermost front surface and thus the yellowing thereof is prevented. On other hand, since the outermost back surface, which will be brought into contact with and bonded to another resin coating layer, is formed by a resin having a low crosslinking density, this back surface has a very high bonding property to the other resin layer.

As explained above, both the bonding property between the layers and the yellowing-preventing property of the outermost cured resin coating layer can be enhanced by making the crosslinking densities of the front and back surface portions of the front surface resin coating layers different from each other.

In still another embodiment of the process of the present invention, the exposure dose in the first election beam irradiation is controlled to a level of 15% or more, preferably 15 to 85%, based on the total exposure dose in the first and second electron beam irradiations, and the exposure dose in the second electron beam irradiation is controlled to 2.5 Mrad or less, preferably 0.5 to 2.5 Mrad.

In the process of the present invention, the outermost coating liquid layer is cured on the shaping surface by the first electron beam irradiation. Therefore, the first electron beam irradiation for forming the outermost cured resin layer does not affect the substrate paper sheet, and thus it is unnecessary to set forth an upper limit of the exposure dose in consideration of the influence on the substrate paper sheet. To prevent the yellowing of the resultant photographic printing paper by the development, however, it is necessary that the outermost cured resin layer has a high crosslinking density. Because of this necessity, the exposure dose of the first electron beam irradiation must be 15% or more based on the total exposure dose in the first and second electron beam irradiations.

On other hand, the second electron beam irradiation applied to the inside coating liquid layer formed on the substrate paper sheet unavoidably affects the substrate paper sheet, and therefore, the exposure dose must be as small as possible as long as the inside coating liquid layer can be cured to a necessary extant. For this purpose, the exposure dose in the second electron beam irradiation is controlled to 2.5 Mrad or less, preferably 0.5 to 2.5 Mrad.

In a still further embodiment of the process of the present invention, the accelerating voltage of the first electron beam irradiation for the outermost coating liquid layer is controlled to 200 kV or less, preferably 100 to 200 kV, and the accelerating voltage of the second electron beam irradiation for the outermost cured resin layer-inside coating liquid layer laminate is controlled to 175 kV or more, preferably 175 to 500 kV, more preferably 175 to 300 kV.

By applying the first and second electron beam irradiations under the above-mentioned accelerating voltages, the deterioration and the yellowing of the substrate paper sheet can be prevented, the outermost cured resin layer can be firmly fixed to the inside cured resin layer, and the yellowing of the resultant photographic printing paper by the developing treatment can be prevented.

The permeation depth of the electron beam varies depending on the thickness of the substrate paper sheet. Therefore, it is preferable that the lower limit of the accelerating voltage of the second electron beam irradiation be 175 kV, and the second electron beam irradiation be applied under an acceleration voltage of the same numerical value or greater as that of the basic weight (g/m$^2$) of the resultant laminate. For example, when the resultant laminate has a basis weight of 200 g/m$^2$, the accelerating voltage of the second electron beam irradiation is preferably carried out under an acceleration voltage of 200 kV or more, more preferably 200 to 300 kV.

EXAMPLES

The present invention will be further explained by way of specific examples which are only representative and do not limit the scope of the present invention in any way.

Example 1

A back surface of a substrate paper sheet having a basis weight of 180 g/cm$^2$ is surface activated by applying a corona discharge treatment, and then coated with a polyethylene resin by a melt-extrude-coating method, to form a back surface resin coating layer having a coating weight of 30 g/m$^2$.

Separately, a mixture (composition 1) of an electron beam-curable organic compound and a white pigment for forming an outermost surface resin coating layer was prepared with the following composition.

Composition 1

| Component | Amount (part by weight) |
|---|---|
| Dipentaerythritol hexaacrylate (trademark: Beam Set 700, made by Arakawa Kagaku Kogyo K.K.) | 80 |
| Titanium dioxide (trademark: Taipak A-220, made by Ishikura Sangyo K.K.) | 20 |

The mixture of the above-mentioned components was dispersed by using a paint conditioner for one hour to provide an electron beam-curable composition.

The composition was coated on a surface of a chromium-plated metal plate employed as a shaping surface, by using a wire bar to form a coating liquid layer having a weight of 5 g/m$^2$ after curing.

To this coating liquid, an electron beam irradiation was applied under an accelerating voltage of 175 kV at an absorbed dose of 2 Mrad to cure the coating liquid layer and to provide an outermost cured resin layer.

Separately, a mixture (composition 2) of an electron beam-curable organic compound with a white pigment for forming an inside coating liquid layer was prepared with the following composition.

Composition 2

| Component | Amount (part by weight) |
|---|---|
| Di-functional ulethaneacrylate oligomer (trademark: Beam Set 550B, made by Arakawa Kagaku Kogyo K.K.) | 36 |
| Di-functional acrylate monomer (trademark: Aronix M-200, made by Toa Gosei K.K.) | 24 |
| Titanium dioxide (trademark: Taipak A-200, made by Ishihara Sangyo K.K.) | 40 |

The mixture of the above-mentioned components was dispersed by using a paint conditioner for one hour to provide an electron beam-curable composition.

The composition was coated on a front surface of the substrate paper sheet by using a wire bar to form a coating liquid layer having a coating weight of 25 g/m$^2$ after curing. This coating liquid layer was superimposed on the outermost cured resin layer on the shaping metal plate surface, and the resultant superimposed layer was subjected to an electron beam irradiation under an acceleration voltage of 175 kV at an absorbed dose of 2 Mrad to cure and bond the inside coating liquid layer to the outermost cured resin coating layer. The resultant laminate was peeled off from the metal plate shaping surface. A support sheet for photographic printing paper was produced.

To test the yellowing property of the resultant photographic printing paper support sheet by a developing treatment, specimens of the support sheet were subjected to a developing treatment using a Darst Automatic Developing Machine (trademark: RCP20, made by Darst Co.).

To evaluate the yellowing property of the specimens of the support sheet after the developing treatment, the b values of the specimens before and after the developing treatment were measured in accordance with the L a b measurement method of TAPPI-T524 (1979), and a difference (Δb value) between the b value before the developing treatment and the b value after the developing treatment was calculated. The difference Δb value was utilized as an indicator for evaluating the yellowing property. The result of the test was indicated in Table 1. When the Δb value is 0.1 or less, the resultant support sheet can be practically used, and the Δb value is more than 1.0, the resultant product is not usable in practice.

The test for the flexibility of the produced sheet was carried out by winding a specimen of the support sheet around a circular rod having a diameter of 0.2 cm in such a manner that the front surface resin coating layer came outside of the wound specimen, and the degree of crack formation in the specimen was observed.

The evaluation result was indicated in three classes in the following manner.

| | |
|---|---|
| No cracks were formed | 3 points |
| Cracks were slightly formed | 2 points |
| Broken | 1 point |

The support sheet having 3 or 2 points was practically usable, whereas the support sheet having 1 point was not usable in practice. The test results are indicated in Table 1.

Example 2

A photographic printing paper support sheet was produced by the same procedures as in Example 1, except that the metal plate used as a shaping surface was replaced by a polyester film having a thickness of 75 μm.

The results of the same tests as in Example 1 are shown in Table 1.

Example 3

A photographic printing paper support sheet was produced by the same procedures as in Example 1, with the following exceptions.

The coating liquid of Composition 2 was coated on the front surface of the above-mentioned substrate paper sheet at a coating weight of 25 g/m$^2$ after curing by using a wire bar, and on the resultant inside coating liquid layer, the coating liquid of Composition 1 was coated in a wet-on-wet manner to form an outermost coating liquid layer. The surface of the resultant superimposed layer was brought into contact with a shaping metal plate surface, and an electron beam irradiation was applied to the superimposed layer under an acceleration voltage of 175 kV at an absorbed dose of 2 Mrad to cure and bond the layers. Then the resultant laminate produced by the above-mentioned procedures was released from the shaping metal plate surface. A photographic printing paper support sheet was obtained.

The results of the same tests as in Example 1 are shown in Table 1.

Example 4

A photographic printing paper support sheet was produced by the same procedures as in Example 1, with the following exceptions.

The coating liquid of Composition 2 was coated on a front surface of the substrate paper sheet by using a wire bar to form an inside coating liquid layer which corresponded to a cured resin layer of 25 g/m$^2$ after curing. The inside coating liquid layer was cured by applying an electron beam irradiation under an acceleration voltage of 175 kV at an absorbed dose of 2 Mrad, to provide an inside cured resin layer. Then, on the inside cured resin layer, a coating liquid of Composition 1 was coated in a wet-on-dry manner to form an outermost coating liquid layer having a coating weight of 5 g/m$^2$ after curing, in tandem with the inside cured resin layer. The surface of the resultant laminate was brought into contact with a shaping metal plate surface and an electron beam irradiation was applied to the laminate from the back surface of the substrate paper sheet under an acceleration voltage of 175 kV at an absorbed dose of 2 Mrad, to form an outermost cured resin layer and bond the outermost cured resin layer to the inside cured resin layer.

The laminate produced by the above-mentioned procedures was released from the shaping metal plate surface to provide a photographic printing paper supporting sheet.

The results of the same tests in Example 1 are shown in Table 1.

Example 5

A photographic printing paper support sheet was produced by the same procedures as in Example 1, with the following exceptions.

The coating liquid of Composition 1 was coated on a shaping metal plate surface by using a wire bar to form an outermost coating liquid layer having a cured solid weight of 5 g/m$^2$. Separately, the coating liquid of Composition 2 was coated on a front surface of the substrate paper sheet by using a wire bar to form an inside coating liquid layer having a coating amount of 25 g/m$^2$ after curing. The inside coating liquid layer was superimposed on the outermost coating liquid layer on the shaping metal plate surface in a wet-on-wet manner, and the resultant superimposed layer was subjected to an electron beam irradiation under an acceleration voltage of 175 kV at an absorbed dose of 2 Mrad to cure and bond the layers. The resultant laminate produced by the above-mentioned procedures was then released from the shaping metal plate surface to provide a photographic printing paper supporting sheet.

The results of the same tests as in Example 1 are indicated in Table 1.

Example 6

A photographic printing paper support sheet was produced by the same procedures as in Example 1, except that the coating liquid of Composition 1 was coated in a cured solid weight of 1.2 g/m$^2$.

The results of the same tests as in Example 1 are shown in Table 1.

Example 7

A photographic printing paper support sheet was produced by the same procedures as in Example 1, except that the coating liquid of Composition 1 was coated in a cured solid weight of 6 g/m$^2$.

The results of the same tests as in Example 1 are shown in Table 1.

Example 8

A photographic printing paper support sheet was produced by the same procedures as in Example 1, except that the coating liquid of Composition 1 was applied in a cured solid weight of 10 g/m$^2$.

The results of the same tests in Example 1 are indicated in Table 1.

Example 9

A photographic printing paper support sheet was produced by the same procedures as in Example 1, with the following exceptions.

A coating liquid (Composition 3) consisting of an electron beam-curable organic compound with a white pigment for an outermost layer was prepared with the following composition and employed in place of the coating liquid of Composition 1.

| Component | Amount (part by weight) |
|---|---|
| Propionic acid-modified pentaerythritol pentaacrylate (trademark: Karayad D-310, made by Nihon Kagaku K.K.) | 80 |
| Titanium dioxide (trademark: Taipak A20, made by Ishihara Sangyo K.K.) | 20 |

The results of the same tests as in Example 1 are shown in Table 1.

Example 10

A photographic printing paper support sheet was produced by the same procedures as in Example 1, with the following exceptions.

A mixture (Composition 4) of an electron beam-curable organic compound with a white pigment was prepared with the following composition to provide a coating liquid for the outermost layer, and used in place of the coating liquid of Composition 1.

Composition 4

| Component | Amount (part by weight) |
|---|---|
| Pentaerythritol tetraacrylate (trademark: Beam Set 710, made by Arakawa Kagaku Kogyo K.K.) | 50 |
| Titanium dioxide (trademark: Taipak A220, made by Ishihara Sangyo K.K.) | 50 |

The results of the same tests as in Example 1 are shown in Table 1.

Example 11

A photographic printing paper support sheet was produced by the same procedures as in Example 1, with the following exceptions.

A mixture (Composition 5) of an electron beam-curable organic compound with a white pigment was prepared with the following composition to provide a coating liquid for forming the outermost layer, and used in place of the coating liquid of Composition 2.

Composition 5

| Component | Amount (part by weight) |
|---|---|
| Tri-functional urethane acrylate oligomer (trademark: New Frontier R-1301, made by Daiichi Kogyo Seiyaku K.K.) | 60 |
| Titanium dioxide (trademark: Taipak A220, made by Ishihara Sangyo K.K.) | 40 |

The results of the same tests in Example 1 are shown in Table 1.

Comparative Example 1

A photographic printing paper support sheet was produced by the same procedures as in Example 1, with the following exceptions.

The coating liquid of Composition 1 was coated on the shaping metal plate surface by using a wire bar to form a coating liquid layer having a cured solid weight of 25 g/m$^2$. On the coating liquid layer surface, the front surface of the substrate paper sheet was superimposed, and an electron beam irradiation was applied to the layer through the substrate paper sheet under an acceleration voltage of 175 kV at an absorbed dose of 2 Mrad, to cure the inside coating liquid layer. Then, the resultant laminate produced by the above-mentioned procedures was released from the shaping metal plate surface, to provide a photographic printing paper support sheet.

The results of the same tests as in Example 1 are shown in Table 1.

Comparative Example 2

A photographic printing paper support sheet was produced by the same procedures as in Comparative Example 1, except that the coating liquid of Composition 1 was replaced by the coating liquid of Composition 2.

The results of the same tests as in Example 1 are shown in Table 1.

Comparative Example 3

A photographic printing paper support sheet was produced by the same procedures as in Example 1, except that the coating liquid of Composition 1 was replaced by a coating liquid consisting of a mixture of the coating liquids of Compositions 1 and 2 in a mixing ratio of 1:1.

The results of the same tests as in Example 1 are shown in Table 1.

The results of the same tests as in Example 1 are shown in Table 1.

Comparative Example 7

A photographic printing paper support sheet was produced by the same procedures as in Example 10, except that the coating liquid of Composition 2 was replaced by that of Composition 1.

The results of the same tests as in Example 1 are indicated in Table 1.

TABLE 1

| | | Item | | | | | | | | |
|---|---|---|---|---|---|---|---|---|---|---|
| | | The number of layers in | Coating liquid composition | | Cured solid amount ($g/m^2$) | | Coating | Shaping | Evaluation | |
| Example No. | | front surface layer | Outermost layer | Inside layer | Outermost layer | Inside layer | meth-od(*) | surface material | Yellowing (Δb value) | Flex-ibility |
| Example | 1 | 2 | Composition 1 | Composition 2 | 5 | 25 | 3 | Metal | 0.2 | 3 |
| | 2 | " | " | " | 5 | 25 | 3 | Film | 0.3 | 3 |
| | 3 | " | " | " | 5 | 25 | 1 | Metal | 0.9 | 3 |
| | 4 | " | " | " | 5 | 25 | 2 | " | 0.9 | 3 |
| | 5 | " | " | " | 5 | 25 | 4 | " | 0.8 | 3 |
| | 6 | " | " | " | 1.2 | 25 | 3 | " | 0.5 | 3 |
| | 7 | " | " | " | 6 | 25 | " | " | 0.3 | 3 |
| | 8 | " | " | " | 10 | 25 | " | " | 0.2 | 2 |
| | 9 | " | Composition 3 | " | 5 | 25 | " | " | 0.4 | 3 |
| | 10 | " | Composition 4 | " | 5 | 25 | " | " | 0.2 | 3 |
| | 11 | " | Composition 1 | Composition 5 | 5 | 25 | " | " | 0.3 | 3 |
| Comparative Example | 1 | 1 | Composition 1 | | 25 | | 5 | " | 0.3 | 1 |
| | 2 | " | Composition 2 | | 25 | | " | " | 13.6 | 3 |
| | 3 | " | Compositions 1 and 2 | | 25 | | " | " | 9.2 | 2 |
| | 4 | " | Composition 1 | Composition 2 | 0.3 | 25 | " | " | 2.7 | 3 |
| | 5 | " | " | " | 25 | 25 | 3 | " | 0.3 | 1 |
| | 6 | " | Composition 3 | Composition 1 | 5 | 25 | " | " | 0.2 | 1 |
| | 7 | " | Composition 4 | " | 5 | 25 | " | " | 0.3 | 1 |

Note:
1 Direct coating in wet-on-wet manner
2 Direct coating in wet-on-dry manner
3 Transfer coating in wet-on-dry manner
4 Transfer coating in wet-on-wet manner
5 Single step transfer coating

Comparative Example 4

A photographic printing paper support sheet was produced by the same procedures as in Example 1, except that the coating liquid of Composition 1 was applied in a solid weight of 0.3 $g/m^2$ after curing.

The results of the same tests as in Example 1 are shown in Table 1.

Comparative Example 5

A photographic printing paper support sheet was produced by the same procedures as in Example 1, except that the coating liquid of Composition 1 was applied in a solid weight of 25 $g/m^2$ after curing.

The results of the same tests as in Example 1 are shown in Table 1.

Comparative Example 6

A photographic printing paper support sheet was produced by the same procedures as in Example 9, except that the coating liquid of Composition 2 was replaced by that of Composition 1.

Example 12

A surface of a substrate paper sheet having a basis weight of 180 $g/m^2$ was surface activated by a corona discharge treatment, and then coated with 30 $g/m^2$ of a polyethylene resin by a melt-extrude-coating method, to form a back surface resin coating layer.

An electron beam-curable resin composition for forming an outermost layer, having the composition as shown below was prepared by a dispersing treatment in a paint conditioner for one hour, and then the composition was coated on a shaping metal plate surface plated with chromium, by using a wire bar in a coating liquid amount corresponding to a cured solid weight of 5 $g/m^2$. To this coating liquid layer, an electron beam irradiation was applied in an atmosphere having an oxygen content of 600 ppm under an acceleration voltage of 165 kV at an absorbed dose of 3 Mrad, to form an outermost cured resin layer.

Electron Beam-Curable Resin Composition for Forming Outermost Cured Resin Layer

| Component | Amount (part by weight) |
|---|---|
| Dipentaerythritol hexaacrylate (trademark: Beam Set 700, made of Arakawa Kagaku Kogyo K.K.) | 80 |
| Titanium dioxide (trademark: A220, made by Ishihara Sangyo K.K.) | 20 |

Separately, an electron beam-curable resin composition having the composition as shown below was prepared by a dispersing treatment using a paint conditioner for one hour. The composition was coated on the opposite surface of the substrate paper sheet on which the back surface resin coating layer was not formed, by using a wire bar at a coating weight corresponding to a cured solid weight of 25 $g/m^2$. This coating liquid layer was superimposed on the outermost cured resin layer on the shaping metal plate surface, and electron beam irradiation was applied to the coating liquid layer through the substrate paper sheet under an acceleration voltage of 175 kV at an absorbed dose of 1.5 Mrad, to provide a front surface resin coating layer composed of the resultant cured resin layer bonded to the outermost cured resin layer. The resultant photographic printing paper support sheet was released from the shaping metal plate surface.

Electron Beam-Usable Resin Composition

| Component | Amount (part by weight) |
|---|---|
| Urethane acrylate oligomer (trademark: Beam Set 550B, made by Arakawa Kagaku Kogyo K.K.) | 36 |
| Di-functional acrylate monomer (trademark: M-220, made by Toa Gosei K.K.) | 24 |
| Titanium dioxide (trademark: A220, made by Ishihara Sangyo K.K.) | 40 |

Performance Test

The bonding property and yellowing-preventing property of the resultant support sheet for photographic printing paper were tested and evaluated.

The bonding property and the yellowing were evaluated in the following manner.

1. Bonding property:

A cellophane tape was adhered to a surface of the electron beam curable resin coating layer of a specimen of a support sheet, and then peeled off. The peeling condition of the resin coating layer was observed and evaluated. The test results are indicated with the following marks:

3 marks: the resin coating layer was completely free from peeling off.

2 marks: the resin coating layer was partially peeled off.

1 mark: the resin coating layer was completely peeled off.

2. Yellowing by developing treatment

A specimen of the support sheet was subjected to a developing treatment by using a Darst automatic developing machine (trademark: RCP20, made by Darst Co.). The colors of the support sheet before and after the developing treatment, and a difference (Δb value) between the b value after the developing treatment and that before the developing treatment was calculated. The degree of yellowing was indicated by the Δb value.

The test results are shown in Table 2.

Example 13

A support sheet for photographic printing paper was prepared by the same procedures as in Example 12, except that the curing of the electron beam-curable resin composition for forming the outermost layer was carried out in an atmosphere having an oxygen content of 1,000 ppm.

The test results are shown in Table 2.

Example 14

A support sheet for photographic printing paper was prepared by the same procedures as in Example 12, except that the electron beam-curable resin composition for forming the outermost layer was cured in the ambient air atmosphere.

The test results are shown in Table 2.

Comparative Example 8

A support sheet for photographic printing paper was prepared by the same procedures as in Example 12, except that the coating liquid layer of the electron beam-curable resin composition for the outermost layer was superimposed, before curing, on the resin layer coated on the substrate paper sheet, and then an electron beam irradiation was applied to the superimposed layer to cure it. The resultant photographic printing paper support sheet was released from the shaping metal plate surface.

The test results are shown in Table 2.

TABLE 2

| | Item | |
|---|---|---|
| Example No. | Bonding property | Yellowing (Δb value) |
| Example 12 | 3 | 0.41 |
| Example 13 | 3 | 0.50 |
| Example 14 | 3 | 0.53 |
| Comparative Example 8 | 3 | 6.75 |

Example 15

A back surface of a substrate paper sheet having a basis weight of 180 $g/m^2$ was surface-activated by a corona discharge treatment and then coated with 30 $g/m^2$ of a polyethylene resin by an extrude-coating method.

Separately, a coating liquid for forming an inside resin coating layer was prepared by a dispersing treatment using a paint conditioner for one hour. The coating liquid was coated on the front surface of the substrate paper sheet by using a wire bar at a coating weight corresponding to a cured solid weight of 20 $g/m^2$, to form an inside coating liquid layer.

Coating Liquid Composition for Forming Inside Resin Coating Layer

| Component | Amount (part by weight) |
|---|---|
| Urethane acrylate oligomer (trademark: Beam Set 550B, made by Arakawa Kagaku Kogyo K.K.) | 36 |
| Di-functional acrylate monomer (trademark: M-220, made by Toa Gosei K.K.) | 24 |
| Titanium dioxide (trademark: A220, made by Ishihara Sangyo K.K.) | 40 |

Separately, a coating liquid composition for forming an outermost resin coating layer having the composition as shown below was prepared by a dispersing treatment using a paint conditioner for one hour. The coating liquid composition was coated on a shaping surface of a chromium-plated metal plate by using a wire bar at a coating weight corresponding to a cured solid weight of 5 $g/m^2$ to form an outermost coating liquid layer. Then a first electron beam irradiation was applied to the coating liquid layer under an acceleration voltage of 175 kV at an absorbed dose of 3 Mrad to provide an outermost cured resin layer. Then, the inside coating liquid layer on the substrate paper sheet was superimposed on the outermost cured resin layer, and a second electron beam irradiation was applied to the superimposed layer through the substrate paper sheet under an acceleration voltage of 175 kV at an absorbed dose of 1 Mrad, to form an inside cured resin layer. The resultant laminate was released from the shaping metal plate surface. A photographic printing paper support sheet was obtained.

Coating Liquid Composition for Forming Outside Resin Coating Layer

| Component | Amount (part by weight) |
|---|---|
| Dipentaerythritol hexaacrylate (trademark: Beam Set 700, made by Arakawa Kagaku Kogyo K.K.) | 80 |
| Titanium dioxide (trademark: A220, made by Ishihara Sangyo K.K.) | 20 |

Performance Test

The following property by developing treatment, degree of deterioration and color-fading property of the resultant support sheet for photographic printing paper were tested and evaluated.

The test and evaluation methods for the items were as follows.

Yellowing property: A specimen of a support sheet was subjected to a developing treatment using an automatic developing machine (trademark: PCP20, made by Darst Co.), and the b values of the specimen were measured in accordance with the L a b value-measuring method, TAPPI- T524. A difference Δb value between the b value of the specimen before the developing treatment and that after the developing treatment was calculated to indicate the yellowing property of the specimen.

When the Δb value is 1.0 or less, the support sheet is usable for practical use.

Degree of deterioration: The tear strength of a specimen of the support sheet was measured in accordance with the method of JIS P 8116. When the tear strength is 110 g or more, the support sheet is usable for practical use.

Color fading property: The whiteness of a specimen of the support sheet was measured in accordance with the method of JIS P 8123 by using a Hunter Whiteness Tester (Dype, made by Toyo Seiki Seisakusho) at a wave length of 475 nm. From the resultant measured value, a ratio (K/S) of a specific absorption coefficient to a specific scattering coefficient was calculated in accordance with the equation (1).

Then, the specimen was placed in a constant temperature air-blowing dryer at a temperature of 105° C. for 2 hours to apply a forced deterioration to the specimen, and then conditioned at a temperature of 20° C. at a relative humidity of 65% (RH) for 24 hours. Therefore, the specimen was subjected again to a whiteness measurement to determine the (K/S) value of the deteriorated specimen. The P.C value (post color value) of the specimen was calculated by the equation (2), to determine the degree of the color fading property. When the P.C value is 1.0 or less, the support sheet is usable for practical use.

$$K/S=(1-R\infty/100)\times 2/(2R\infty/100) \qquad (1)$$

$$\text{P.C value}=100[(K/S)_a-(K/S)_b] \qquad (2)$$

wherein R∞:whiteness

K:specific absorption coefficient

S:specific scattering coefficient $(K/S)_a$:(K/S) value after the deterioration treatment $(K/S)_b$:(K/S) value before the deterioration treatment.

The results of the tests are shown in Table 3.

Example 16

A photographic printing paper support sheet was prepared by the same procedures as in Example 15, except that the first electron beam irradiation was carried out under an acceleration voltage of 175 kV at an absorbed dose of 2 Mrad, and the second electron beam irradiation was carried out under an accelerating voltage of 175 kV at an absorbed dose of 2 Mrad.

The results of the same tests as in Example 15 are shown in Table 3.

Example 17

A photographic printing paper support sheet was prepared by the same procedures as in Example 15, except that the first electron beam irradiation was carried out under an acceleration voltage of 175 kV at an absorbed dose of 0.5 Mrad, and the second electron bean irradiation was carried out under an accelerating voltage of 175 kV at an absorbed dose of 2.5 Mrad.

The results of the same tests as in Example 15 are shown in Table 3.

TABLE 3

| Example No. | Exposed dose of electron beam (Mrad) First | Exposed dose of electron beam (Mrad) Second | Proportion of first electron beam exposed dose (%) (*)$_3$ | Yellowing (Δb value) | Deterioration (tear strength) (g) | Fading (PC value) |
|---|---|---|---|---|---|---|
| Example 15 | 3.0 | 1.0 | 75 | 0.2 | 124.0 | 0.5 |
| Example 16 | 2.0 | 2.0 | 50 | 0.4 | 122.5 | 0.7 |
| Example 17 | 0.5 | 2.5 | 17 | 0.6 | 120.5 | 0.7 |
| Referential Example(*)$_2$ | — | — | — | 0.2 | 125.0 | 0.6 |

Note:
(*)$_2$Referential Example - Support sheet for photographic printing paper having two polyethylene resin coating layers formed on both the surfaces of a substrate paper sheet
(*)$_3$Proportion of first electron beam exposed dose to total exposed dose of first and second electron beam irradiations Example 18

A back surface of a fine paper sheet having a basis weight of 150 g/m$^2$ was surface-activated by a corona discharge treatment, and coated with 30 g/m$^2$ of a polyethylene resin by an melt-extrude-coating method to form a back surface resin coating layer.

Then a front surface of the fine paper sheet was coated with a 10% solution of an ethylene-acrylic acid copolymer alkali salt (trademark: Zaiccen, made by Sumitomo Seika K.K. at a coating weight corresponding to a cured solid weight of 1.5 g/m$^2$, and dried to provide a substrate paper sheet (A).

Separately, a mixture of an electron beam-curable organic compound with a white pigment for an outermost cured resin layer was prepared in the composition as shown below by a dispersing procedure using a paint conditioner for one hour, to provide an electron beam-curable composition (Composition 6).

Composition 6

| Component | Amount (part by weight) |
|---|---|
| Dipentaerythritol hexaacrylate (trademark: Beam Set 700, made by Arakawa Kagaku Kogyo K.K.) | 80 |
| Titanium dioxide (trademark: Taipak A220, made by Ishihara Sangyo K.K.) | 20 |

The composition 6 was coated on a shaping surface of a chromium-plated metal plate by using a wire bar at a coating weight corresponding to a cured solid weight of 5 g/m$^2$, and then the resultant coating liquid layer was cured by applying an electron beam irradiation under an acceleration voltage of 165 kV at an exposure dose of 2 Mrad, to provide an outermost cured resin layer.

Separately, an electron beam curable composition (Composition 7) was prepared by dispersing a mixture of an electron beam-curable organic compound with a white pigment for an inside cured resin layer, by using a paint conditioner for one hour.

Composition 7

| Component | Amount (part by weight) |
|---|---|
| Urethane acrylate oligomer (trademark: Beam Set 550B, made by Arakawa Kagaku Kogyo K.K.) | 30.0 |
| Di-functional acrylate monomer (trademark: Aronix M-220, made by Toa Gosei K.K.) | 24.0 |
| Titanium dioxide (trademark: Taipak A220, made by Ishihara Sangyo K.K.) | 40.0 |

The composition 7 was coated on the front surface of the substrate paper sheet at a coating weight corresponding to a cured solid weight of 20 g/m$^2$, by using a wire bar, the resultant inside coating liquid layer was superimposed on the outermost cured resin layer on the shaping metal plate surface, and an electron beam irradiation was applied to the superimposed coating liquid layer through the substrate paper sheet under an acceleration voltage of 300 kV at an exposure dose of 2 Mrad, to cure the coating liquid layer and bond the resultant inside cured resin layer to the outermost cured resin layer. The resultant laminate prepared by the above-mentioned procedures was released from the shaping metal plate surface to provide a support sheet.

Performance Test

The solvent resistance, oil resistance, tear strength, bonding strength between the layers and yellowing property (whiteness) of the support sheet for photographic printing paper were tested and evaluated by the following testing methods.

The test results are shown in Table 4. Testing method for resistance to solvent: An organic solvent (a mixture of methylethylketone (MEK) with toluene in mixing ratio by volume of 1:1 was contained in an absorbent cotton mass and the surface of the outermost cured resin layer was rubbed by the cotton mass 100 times, and the solvent resistance was indicated by the rubbing number at which the outermost cured resin layer surface was peeled off.

Testing method of resistance to oil: One drop of caster oil colored by oil red was dropped onto a surface of an outermost cured resin layer, the caster oil was removed after a lapse of one hour, and the degree of smelling of the cured resin layer surface was observed. The oil resistance was indicated in the following three classes.

3 marks: No change occurred.

2 marks: Slight wrinkles were formed.

1 mark: Wrinkles were formed on the entire surface.

Tear strength-testing method: The tear strength of the laminate sheet in a transversal direction thereof was measured in accordance with the testing method of tear strength of paper or sheet or paper board, JIS P-8116.

Testing method for bonding strength between layers: A cellophane adhesive tape (trademark: cellotape) was adhered to a surface of an outermost cured resin layer, peeled off in a moment at an angle of 90 degrees, and the peeling conditions of the outside cured resin layer from the inside cured resin layer were observed. The test results were indicated by the following three marks.

3 marks: No peeling off occurred.

2 marks: Partially peeled off.

1 mark: Entirely peeled off.

Yellowing testing method: The whiteness of the outermost cured resin layer surface of the laminate sheet was measured by the Hunter whiteness-testing method for paper sheet or paper board, JIS P-8123.

Example 19

A support sheet for photographic printing paper was produced by the same procedures as in Example 18, with the following exceptions.

A substrate paper sheet (B), which was the same as the substrate paper sheet (A) except that the back surface polyethylene layer was omitted, was coated with Composition 6 in the same manner as in Example 18, and the resultant coating liquid layer was cured by a first electron beam irradiation under an acceleration voltage of 200 kV at an exposure dose of 2.0 Mrad. The Composition 7 was replaced by Composition 8 having the composition as shown below. The resultant superimposed layer was cured by a second electron beam irradiation under an acceleration voltage of 200 kV at an exposure dose of 2.0 Mrad, to provide a support sheet for photographic printing paper.

The test results are shown in Table 4.

Composition 8

| Component | Amount (part by weight) |
|---|---|
| Urethane acrylate oligomer (trademark: New Frontier R-1301, made by Daiichi Kogyo Seiyaku K.K.) | 30 |
| Mono-functional acrylate monomer (trademark: New Frontier NP-2, made by Daiichi Kogyo Seiyaku K.K.) | 20 |
| Titanium dioxide (trademark: Taipak CR-58, made by Ishihara Sangyo K.K.) | 50 |

Example 20

A support sheet for photographic printing paper was produced by the same procedures as in Example 18, with the following exceptions.

A substrate paper sheet (C) was produced by forming 20 $g/m^2$ of a polyethylene layer on a back surface of a fine paper sheet having a basis weight of 75 $g/m^2$ and then coating the front surface of the substrate paper sheet with an ethylene-acrylic acid copolymer alkali salt at a coating weight corresponding to a cured solid weight of 1.5 $g/m^2$ and drying the layer.

On the substrate paper sheet (C), the same front surface composite resin coating layer having a two-layer structure as in Example 18 was formed to provide a support sheet for a photographic printing sheet.

The test results are shown in Table 4.

Example 21

A support sheet for photographic printing paper was produced by the same procedures as in Example 18, with the following exceptions.

The same substrate paper sheet (B) as in Example 19 was employed.

The coating liquid of Composition 6 was coated in an amount of 15 $g/m^2$ and the first electron beam irradiation was applied under an acceleration voltage of 65 kV at an exposure dose of 2.0 Mrad.

The coating liquid of Composition 7 was coated in an amount of 15 $g/m^2$ and the second electron beam irradiation was applied under an acceleration voltage of 300 kV at an exposure dose of 2.0 Mrad.

The test results are shown in Table 4.

TABLE 4

| Item | Example No. 18 | 19 | 20 | 21 |
|---|---|---|---|---|
| Basis weight of substrate paper sheet ($g/m^2$) | 180 | 150 | 95 | 150 |
| Weight of inside cured resin layer ($g/m^2$) | 20 | 20 | 20 | 15 |
| Weight of outermost cured resin layer ($g/m^2$) | 5 | 5 | 5 | 15 |
| Total weight of resultant laminate ($g/m^2$) | 205 | 175 | 120 | 180 |
| Acceleration voltage of first electron beam irradiation (kV) | 165 | 200 | 165 | 165 |
| Acceleration voltage of second electron beam irradiation (kV) | 300 | 200 | 300 | 300 |
| Exposed dose of first electron beam irradiation (Mrad) | 2.0 | 2.0 | 2.0 | 2.0 |
| Exposed dose of second electron beam irradiation (Mrad) | 2.0 | 2.0 | 2.0 | 2.0 |
| Resistance to solvent (times) | >100 | >100 | >100 | >100 |
| Resistance to oil (Marks) | 2 | 3 | 3 | 3 |
| Specific tear strength | 65 | 63 | 66 | 68 |
| Bonding strength between layers (Marks) | 3 | 3 | 3 | 3 |
| Yellowing (whiteness) (%) | 90 | 89 | 91 | 88 |

The support sheet for photographic printing paper of the present invention can effectively restrict the yellowing phenomenon of the coating layer which usually occurs in the conventional support sheet having an electron beam-cured resin coating layer upon being developed, and has a satisfactory flexibility. Therefore, the support sheet is very useful for practical use.

Also, the process of the present invention enables a support sheet for photographic printing paper to be produced by simple procedures at a high efficiency.

We claim:

1. A support sheet for photographic printing paper, comprising:

a substrate paper sheet comprising a natural pulp as a principal component;

a front surface composite resin coating layer formed on a surface of the substrate paper sheet and comprising a laminate structure comprising at least one inner cured resin layer comprised of, as a principal component, an unsaturated organic compound curable by electron beam irradiation, and an outermost cured resin layer comprised of, as a principal component, an unsaturated organic compound curable by an electron beam irradiation laminated on the inner cured resin layer; said outermost cured resin layer having a higher density of crosslinking than that of the inner cured resin layer and a back surface resin coating layer formed on the opposite surface of the substrate paper sheet and comprising, as a principal component, at least one film-forming synthetic resin.

2. The support sheet for photographic printing paper as claimed in claim 1, wherein the front surface composite resin coating layer is present in a dry amount of 5 to 60 $g/m^2$.

3. The support sheet for photographic printing paper as claimed in claim 1, wherein the outermost cured resin layer is present in a dry amount of 0.5 to 20 $g/m^2$.

4. The support sheet for photographic printing paper as claimed in claim 1, wherein the unsaturated organic compound which is curable by the electron beam irradiation is selected from the group consisting of:

(1) acrylate compounds of aliphatic, cycloaliphatic and aromatic mono- to hexa-valent alcohols and polyalkyleneglycols;

(2) acrylate compounds of addition reaction products of aliphatic, cycloaliphatic and aromatic mono-to hexa-valent alcohols with alkyleneoxides;

(3) polyacryloylalkylphosphoric acid esters;

(4) reaction products of carboxylic acids with polyols and acrylic acid;

(5) reaction products of isocyanates with polyols and acrylic acid;

(6) reaction products of epoxy compounds with acrylic acid; and (7) reaction products of epoxy compounds with polyols and acrylic acid.

5. The support sheet for photographic printing paper as claimed in claim 1, wherein the unsaturated organic compound which is curable by the electron beam irradiation is selected from the group consisting of polyoxyethyleneepichlorohydrin-modified bisphenol A diacrylate, dicyclohexylacrylate, epichlorohydrin-modified polyethyleneglycoldiacrylate, 1,6-hexanedioldiacrylate, hydroxypivalic acid ester neopentylglycoldiacrylate, nonylphenoxypolyethyleneglycolacrylate, ethyleneoxide-modified phenoxidized phosphoric acid acrylate, ethyleneoxide-modified phthalic acid acrylate, polybutadieneacrylate, caprolactam-modified tetrahydrofurfurylacrylate, tris(acryloxyethyl) isocyanurate, trimethylolpropanetriacrylate, pentaerythritoltriacrylate, pentaerythritoltetraacrylate, dipentaerythritolhexaacrylate, polyethyleneglycoldiacrylate, 1,4-butadienedioldiacrylate, neopentylglycoldiacrylate, and neopentylglycol-modified trimethylolpropanediacrylate.

6. The support sheet for photographic printing paper as claimed in claim 1, wherein the unsaturated organic compound curable by the electron beam irradiation and used for forming the outermost cured resin layer has four or more crosslinking functional groups per molecule thereof.

7. The support sheet for photographic printing paper as claimed in claim 1, wherein the unsaturated organic compound curable by the electron beam irradiation and used for forming the inner cured resin layer has less than four crosslinking functional groups per molecule thereof.

8. The support sheet for photographic printing paper as claimed in claim 1, wherein at least one layer of the outermost cured resin layer and the inner cured resin layer further comprises a white pigment consisting of at least one member selected from the group consisting of titanium dioxide, barium sulfate, calcium carbonate, aluminum oxide, zinc oxide, magnesium hydroxide and magnesium oxide.

9. The support sheet for photographic printing paper as claimed in claim 8, wherein the white pigment is present in a total amount of 20 to 40% by weight based on the total solid content weight of the front surface resin coating layer.

10. The support sheet for photographic printing paper as claimed in claim 1, wherein the film-forming synthetic resin for forming the back surface resin coating layer is selected from the group consisting of polyolefin resins and electron beam-curing products of at least one unsaturated organic compound curable by an electron beam irradiation.

11. The support sheet for photographic printing paper as claimed in claim 1, wherein the back surface resin coating layer is present in a dry amount of 10 to 40 $g/m^2$.

12. The support sheet for photographic printing paper as claimed in claim 1, wherein the substrate paper sheet is present in a dry amount of 50 to 300 $g/m^2$.

13. The support sheet for photographic printing paper as claimed in claim 1, wherein the substrate paper sheet contains 1 $g/m^2$ or more of at least one inorganic magnesium compound.

14. The support sheet for photographic printing paper as claimed in claim 13, wherein the magnesium compound is selected from the group consisting of magnesium oxide, magnesium hydroxide, magnesium carbonate and magnesium sulfate.

15. A process for producing a support sheet for photographic printing paper, comprising the steps of:

forming at least one inner coating liquid layer comprising, as a principal component, at least one unsaturated organic compound curable by an electron beam irradiation on a surface of a substrate paper sheet comprising, as a principal component, a natural pulp;

separately forming an outermost cured resin layer on a shaping surface by forming an outermost coating liquid layer comprising, as a principal component, at least one unsaturated organic compound curable by an electron beam irradiation on the shaping surface, and then applying a first electron beam irradiation to the outermost coating liquid layer;

superimposing the inner coating liquid layer formed on the substrate paper sheet on the outermost cured resin layer and then applying a second electron beam irradiation to the resultant superimposed layer, whereby a front surface composite resin coating layer having a laminate structure comprised of (1) at least one inner cured resin layer adjacent to the substrate paper sheet and (2) an outermost cured resin layer laminated on and bonded to the inner cured resin layer is formed and the resultant outermost cured resin layer has a higher density of crosslinking than that of the resultant inner cured resin layer;

releasing the resultant laminate composed of the substrate paper sheet and the front surface composite resin coating layer from the shaping surface; and forming a back surface resin coating layer comprising, as a principal component, a film-forming synthetic resin on the opposite surface of the substrate paper sheet.

16. The process for producing the support sheet for a photographic printing paper, as claimed in claim 15, wherein the front surface composite resin coating layer is present in a dry amount of 5 to 60 $g/m^2$.

17. The process for producing the support sheet for a photographic printing paper, as claimed in claim 15, wherein the outermost cured resin layer is present in a dry amount of 0.5 to 20 $g/m^2$.

18. The process for producing the support sheet for photographic printing paper, as claimed in claim 15, wherein the unsaturated organic compound which is curable by the electron beam irradiation is selected from the group consisting of:

(1) acrylate compounds of aliphatic, cycloaliphatic and aromatic mono- to hexa-valent alcohols and polyalkyleneglycols;

(2) acrylate compounds of addition reaction products of aliphatic, cycloaliphatic and aromatic mono-to hexavalent alcohols with alkyleneoxides;

(3) polyacryloylalkylphosphoric acid esters;

(4) reaction products of carboxylic acids with polyols and acrylic acid;

(5) reaction products of isocyanates with polyols and acrylic acid;

(6) reaction products of epoxy compounds with acrylic acid; and (7) reaction products of epoxy compounds with polyols and acrylic acid.

19. The process for producing the support sheet for photographic printing paper, as claimed in claim 15, wherein the unsaturated organic compound which is curable by the electron beam irradiation is selected from the group consisting of polyoxyethyleneepichlorohydrin-modified bisphenol A diacrylate, dicyclohexylacrylate, epichlorohydrin-modified polyethyleneglycoldiacrylate, 1,6-hexanedioldiacrylate, hydroxypivalic acid ester neopentylglycol diacrylate, nonylphenoxypolyethyleneglycolacrylate, ethyleneoxide-modified phenoxidized phosphoric acid acrylate, ethyleneoxide-modified phthalic acid acrylate, polybutadieneacrylate, caprolactam-modified tetrahydrofurfurylacrylate, tris(acryloxyethyl) isocyanurate, trimethylolpropanetriacrylate, pentaerythritoltriacrylate, pentaerythritoltetraacrylate, dipentaerythritolhexaacrylate, polyethyleneglycoldiacrylate, 1,4-butadienedioldiacrylate, neopentylglycoldiacrylate, and neopentylglycol-modified trimethylolpropanediacrylate.

20. The process for producing the support sheet for a photographic printing paper, as claimed in claim 15, wherein the unsaturated organic compound contained in the outermost coating liquid layer and curable by an electron beam irradiation has four or more crosslinking functional groups per molecule thereof.

21. The process for producing the support sheet for a photographic printing paper, as claimed in claim 15, wherein the unsaturated organic compound contained in the inner coating liquid layer and curable by an electron beam irradiation has less than four crosslinking functional groups per molecule thereof.

22. The process for producing the support sheet for a photographic printing paper, as claimed in claim 15, wherein at least one layer selected from the group consisting of outermost coating liquid layer and the inner coating liquid layer further comprises a white pigment consisting of at least one member selected from titanium dioxide, barium sulfate, calcium carbonate, aluminum oxide, zinc oxide, magnesium hydroxide, and magnesium oxide.

23. The process for producing the support sheet for photographic printing paper, as claimed in claim 22, wherein the white pigment is present in a total amount of 20 to 80% by weight based on the total solid content weight of the front surface cured resin layer.

24. The process for producing the support sheet for a photographic printing paper, as claimed in claim 15, wherein the film-forming synthetic resin for the back surface resin coating layer is selected from the group consisting of polyolefin resins and electron beam-curing products of at least one unsaturated organic compound curable by an electron beam irradiation.

25. The process for producing the support sheet for a photographic printing paper, as claimed in claim 15, wherein the back surface resin coating layer is present in a dry amount of 10 to 40 g/m$^2$.

26. The process for producing the support sheet for a photographic printing paper, as claimed in claim 15, wherein the substrate paper sheet has a basis weight of 50 to 300 g/m$^2$.

27. The process for producing the support sheet for a photographic printing paper, as claimed in claim 15, wherein the shaping surface is a peripheral surface of a shaping drum.

28. The process for producing the support sheet for a photographic printing paper, as claimed in claim 27, wherein the outermost coating liquid layer is formed on a peripheral surface of the shaping drum; the first electron beam irradiation is applied to the outermost coating liquid layer on the shaper drum peripheral surface; the inner coating liquid layer on the substrate paper sheet is superimposed on the resultant cured resin layer formed by the first irradiation; and to the resultant superimposed layer the second electron beam irradiation is applied through the substrate paper sheet.

29. The process for producing the support sheet for a photographic printing paper, as claimed in claim 15, wherein the shaping surface is a surface of a synthetic resin film.

30. The process for producing the support sheet for a photographic printing paper, as claimed in claim 29, wherein the outermost coating liquid layer is formed on the shaping surface of the synthetic resin film; the first electron beam irradiation is applied to the outermost coating liquid layer on the shaping surface of the synthetic resin film; the inner coating liquid layer formed on the substrate paper sheet is superimposed on the resultant outermost cured resin layer formed by the first irradiation; and to the resultant superimposed layer, the second electron beam irradiation is applied through the synthetic resin film.

31. The process for producing the support sheet for a photographic printing paper, as claimed in claim 15, wherein the first and second electron beam irradiations are applied under an acceleration voltage of 100 to 300 kV.

32. The process for producing the support sheet for a photographic printing paper, as claimed in claim 15, wherein the first and second electron beam irradiations are applied at an absorbed dose of 0.1 to 6 Mrad.

33. The process for producing the support sheet for a photographic printing paper, as claimed in claim 15, wherein the first and second electron beam irradiation is applied in an atmosphere having an oxygen content of 500 ppm or less.

34. The process for producing the support sheet for a photographic printing paper, as claimed in claim 15, wherein the first electron beam irradiation for the outermost coating liquid layer formed on the shaping surface is carried out in an atmosphere having an oxygen content of 600 ppm or more.

35. The process for producing the support sheet for a photographic printing paper, as claimed in claim 15, wherein the exposed dose of the first electron beam irradiation is controlled to a level of 15% or more based on the total exposed dose of the first and second electron beam irradiations, and the exposed dose of the second electron beam irradiation is controlled to a level of 2.5 Mrad or less.

36. The process for producing the support sheet for a photographic printing paper, as claimed in claim 15, wherein the acceleration voltage of the first electron beam irradiation for the outermost coating liquid layer is controlled to a level of 200 kV or less, and the acceleration voltage of the second electron beam irradiation for the superimposed layer is controlled to a level of 175 kV or more.

* * * * *